United States Patent [19]

Bass

[11] Patent Number: 4,899,671
[45] Date of Patent: Feb. 13, 1990

[54] METHOD FOR MEASURING TEMPERATURE OF HOT GASES INSIDE A VESSEL WHICH RADIATES MICROWAVE ENERGY

[75] Inventor: Ronald M. Bass, Houston, Tex.

[73] Assignee: Shell Oil Company, Houston, Tex.

[21] Appl. No.: 282,768

[22] Filed: Dec. 9, 1988

[51] Int. Cl.$^4$ .................................................. F23B 7/00
[52] U.S. Cl. ...................................... 110/341; 110/186; 110/190; 374/122
[58] Field of Search .................. 110/341, 186, 190; 73/355; 374/122

[56] References Cited

U.S. PATENT DOCUMENTS

| | | | |
|---|---|---|---|
| 4,106,340 | 8/1978 | Hamid | 73/355 |
| 4,568,199 | 2/1986 | Schmidt | 374/122 |
| 4,724,775 | 2/1988 | May | 110/186 |
| 4,797,776 | 1/1989 | Snyder | 110/190 X |

Primary Examiner—Edward G. Favors
Attorney, Agent, or Firm—Ronald R. Reper

[57] ABSTRACT

An improved method for measuring temperature of hot gases inside a vessel which radiates microwave energy, which method comprises sensing the energy at a frequency above about 100 gigahertz whereby the effect on said measurement of any solids entrained in the gases and of the vessel is minimized. The method is particularly suited to determining rapidly fluctuating temperatures.

4 Claims, No Drawings

METHOD FOR MEASURING TEMPERATURE OF HOT GASES INSIDE A VESSEL WHICH RADIATES MICROWAVE ENERGY

BACKGROUND OF THE INVENTION

This invention concerns the temperature measurement of hot gases within a vessel having a hot surface which radiates microwave energy. The method is particularly suited to gases laden with entrained solids.

Generally temperatures inside of furnaces, reactors, incinerators, and the like are measured by optical or infrared pyrometers since the temperatures involved may exceed the capabilities, of, e.g., thermocouples. These optical or infrared pyrometers are aimed at the point of interest through a sight hole or inspection door. In the case of modern coal gasification reactors which operate under significant pressure, transparent windows of quartz and the like, can be used. However the harsh environment within the reactor makes it extremely difficult to keep these transparent windows clear for extended periods.

Many of the problems of such prior art are overcome by the use of a microwave radiometer to sense microwave energy emitted from a heated vessel. As described, e.g., in U.S. 4,568,199, incorporated herein by reference, the sensed energy is converted into a signal indicative thereof, and the amplitude of the signal is measured as an indication of the general temperature inside the vessel. This signal measures not only the temperature of the gases within the vessel, but is influenced by the temperature and microwave absorption properties of any suspended solids, and also by the radiation from any refractory or slag lining in the vessel which will have a temperature which will decrease as the distance increases from the hottest surface of the refractory. These influences tend to dampen the ability to measure rapid temperature fluctuations as may occur within the vessel, not only with regard to actual temperature of the gases, but also in creating a time lag as the temperatures within the entrained solids and in the refractory equilibrate with the temperature of the gases at their surface. For some applications, such as chemical conversion processes, it would be highly desirable to obtain a signal that would indicate the temperature of the gases and just the surface, of any entrained solids in contact with such gases (which surfaces would virtually be at the same temperature), and wherein such signal is capable of tracking rapid fluctuations in said temperature. Such a method has now been found.

SUMMARY OF THE INVENTION

In accordance with the present invention there is provided a method for measuring temperature of hot gases within a vessel, which method comprises:

(a) sensing the microwave energy emitted from said gases, any entrained solids, and the inner surface of the vessel;

(b) converting said sensed microwave energy into an electrical signal indicative thereof; and (c) measuring the amplitude of said signal as an indication of the temperature of said gases, the improvement which comprises sensing the microwave energy at a frequency in the range above 100 GigaHertz (GHz), whereby temperature of the gases, the temperature of the entrained solids and the temperature of substantially only the inner surface of the vessel or slag in contact with the gases contribute to the signal.

In a suitable embodiment of the invention the method is applied to hot gases in admixture with materials being fed to and undergoing chemical conversion in a vessel, and comprises the further step of controlling the rate of flow of at least one of the materials fed to said vessel in response to said indicated temperature to maintain a desired temperature range of said hot gases in said vessel.

In a particular embodiment of the invention the method is applied to gases in a vessel arising from the partial combustion of a carbonaceous fuel such as finely divided coal with a free oxygen-containing gas in said vessel and the rate of flow of at least one of said fuel and oxygen being fed to said vessel is controlled to maintain the temperature of the gases within said vessel within a desired temperature range.

DESCRIPTION OF PREFERRED EMBODIMENTS

The principle upon which the present invention is based is the measurement of Hertzian waves of ultra-high frequency in the range about 100 GHz and higher, preferably in the range from about 100 to about 300 GHz, and particularly from about 105 to about 140 GHz, so as to determine the radiation from only the surface with little, if any, effect from the bulk of the vessel, which may be coated with a refractory such as silicon nitride and/or a slag formed from adherent entrained solids, as well as any entrained solids. When the gas temperature fluctuates, the surface temperature of the solids will respond and fluctuate accordingly, however, the temperature of the bulk of the vessel lining and/or slag layer will respond much more slowly to the gases temperature changes. It has been found that by use of microwave energy above 100 GHz, that the detected signal responds to the temperature of the solids to a depth of but a few tenths of a millimeter, and the resulting signal will essentially faithfully track the surrounding gas temperature.

The method of the invention is suitably applied to continuously and rapidly measure temperatures within vessels containing hot gases having entrained solids and at temperature up to about 2000° C., and preferably in the range up to about 1600° C., and pressures in the range from about 1 to about 30 bar.

For existing vessels having, e.g., a transparent window in the pressure membrane, a microwave radiometer can be positioned to replace an optical pyrometer and the radiometer antenna will continue to function even after optical transparency of the window is seriously diminished. For applications where the solids entrained in the gases are likely to adhere to the vessel wall, it is desirable to flow a small amount of a purge gas through the sight hole into the vessel to maintain a clear radiation path to the antenna.

While the method according to the invention may be employed with any suitable microwave antenna, it is of particular advantage when employing an aperture antenna since the frequency range above 100 GHz is of very small dimension, e.g., on the order of about 2.3 mm diameter. This is advantageous in requiring only a very small amount of purge gas to keep the aperture free from solids which are entrained in the hot gases. For many chemical processes keeping such purge gas requirements to a minimum is important for temperature and quality of the reaction product exiting vessel and- /or purification steps needed to obtain the quality desired.

In a preferred mode the method will be applied using a Dicke type radiometer to compare the signal from the radiometer antenna operating at the selected frequency, i.e., the sensed microwave energy from the hot gases, with the microwave energy signal from a second source, which second source has a lower, known or predetermined temperature. The predetermined temperature may be any temperature suitable to the environment or from any convenient source such as, e.g., solid carbon dioxide, frozen water, room temperature, boiling water and then like. The sensed microwave energy and the microwave energy signal from the lower temperature source may be compared at rapid intervals, e.g., 10 times per second, and preferably 100 to 1000 times per second or more and the difference converted to an electrical signal. This electrical signal representing the temperature difference then represents the fluctuations in temperature of the hot gases being observed. The electrical signal may be used as such or converted to a pneumatic or electronic signal as desired, it may be magnified and/or displayed in any convenient manner such as an oscilliscope, recording instrument or the like.

Accordingly, by using the method of the invention to more accurately determine temperature of gases containing entrained solids and also the fluctuation rate of such temperatures within a vessel the invention provides means to determine more precisely what effect varying operating parameters to the hot gases in the vessel have on gas temperature and/or its fluctuation rate, i.e., smoothness or stability of the reaction process taking place within the vessel. Take, for example, a partial combustion process where a carbon-containing fuel is fed along with a free oxygen-containing gas such as air to a reaction zone within a vessel and is "gasified" to carbon monoxide. It is possible to vary the amount of carbon fed to the burners while keeping the amount of oxidant constant and by use of the method according to the invention to better track the temperature of the hot gases and the fluctuation in temperature with minimal effect from the increased particulate matter resulting from the ash content of the carbon source.

The invention will now be described in more detail with reference to the following illustrative embodiment.

ILLUSTRATIVE EMBODIMENT

Into an upright coal gasifier vessel finely divided coal particles are fed together with a free-oxygen containing gas and are partially combusted in a turbulent environment at a temperature about 1900 K and pressure of about 20 atmospheres to a product containing significant amounts of carbon monoxide and hydrogen gas. Entrained solids, resulting mainly from ash content of the coal are present in amounts up to about 1 per cent by weight of the hot gases. The hot entrained solids, initially have a particle size on the order of 50 microns, but collide with each other and the vessel walls and agglomerate resulting in larger particles and the continual building and rebuilding of a slag layer having a depth of up to about 15 mm and more at which time portions of the slag slough off and are removed from the bottom of the vessel. A Dicke Radiometer is installed in the side wall of the vessel. It is found that power attenuation of the gas is due almost entirely to the solids, and that the received power at the radiometer from both the entrained solids and slag is significant. The slag is a glass-like material, with some uncombusted carbon content having a dielectric constant of about 3 and an effective electrical conductivity of about 12 mhos/meter.

The attenuation constant of the solids and slag may be calculated from the standard relation in lossy media.

$$a_s = 4\pi (0.5\, k'(1+K''^2)^{.5} - 1)^{.5}/L \text{ meters}^{-1}$$

where
$k'$ = relative dielectric constant
$k'' = s/w\, k'e_o$
$s$ = effective electrical conductivity, mhos/M
$e_o$ = permittivity of free space, F/M
$L$ = wavelength in free space, M.

The skin depth (penetration depth for 1/e attenuation of the electric field) is $\frac{1}{2}\, a_s$ as meters.

Putting in values for the range of dielectric constant and conductivity expected for the slag at 110 GHz, we get:
power attenuation constant: 5400 —15400 M$^{-1}$
skin depth: 0.13 –0.32 mm.

It is found that the radiation is very insensitive to temperature variations at depths greater than two skin depths. By applying a range of frequencies it is found that the radiation depth in the slag is lowest at frequencies above about 100 GHz. Comparison of radiation depth (i.e., two times skin depth) vs frequency is given for representative slag parameters in the following Table.

| FREQUENCY, GHz | RADIATION DEPTH, mm |
|---|---|
| 10 | 1.72 |
| 20 | 1.24 |
| 30 | 1.04 |
| 40 | .92 |
| 50 | .84 |
| 60 | .78 |
| 70 | .74 |
| 80 | .72 |
| 90 | .68 |
| 100 | .66 |
| 110 | .64 |
| 120 | .64 |

Accordingly, by use of frequencies above about 100 GHz, just the surface of the slag and solids will contribute to the antenna signal of the radiometer.

It is clear that variations and modifications of the present invention can be made without departing from the scope of the invention. It should also be understood that the scope of the invention is not limited to the specific embodiments which have been described, but should be considered in accordance with the following claims read in light of the foregoing disclosure.

What is claimed is:

1. In a method for measuring temperature of hot gases within a vessel, which gases may contain entrained solids, which method comprises:
   (a) sensing the microwave energy emitted from said gases, any entrained solids, and the inner surface of the vessel;
   (b) converting said sensed microwave energy into an electrical signal indicative thereof; and
   (c) measuring the amplitude of said signal as an indication of the temperature of said gases, the improvement which comprises sensing the microwave energy at a frequency in the range above 100 Gigahertz, whereby the temperature of the gases, the temperature of the entrained solids, and the temperature of substantially only the inner surface of the vessel in contact with the gases contribute to the signal.

2. A method as in claim 1, which further comprises comparing said sensed microwave energy with the microwave energy from a second source having a stable known temperature, to obtain a comparative electrical signal indicative of the difference in temperatures between the hot gases and said second source, and amplifying said comparative signal whereby changes in the temperature of said hot gases may be readily detected.

3. A method as in claim 1, wherein said hot gases are in admixture with materials being fed to and undergoing chemical conversion in a vessel, and comprising the further step of controlling the rate of flow of at least one of the materials fed to said vessel in response to said indicated temperature to maintain a desired temperature range of said hot gases in said vessel.

4. A method as in claim 3, wherein said chemical conversion is the partial combustion of finely divided coal with a free-oxygen containing gas and the rate of flow of at least one of said coal and oxygen is controlled in response to said indicated temperature whereby a desired temperature range of the gases within said vessel is maintained.

* * * * *